Feb. 10, 1970  S. ROSIN ET AL  3,494,688
COLOR CORRECTED MANGIN MIRROR
Filed April 6, 1967  4 Sheets-Sheet 1

INVENTORS
SEYMOUR ROSIN
MAX AMON
BY
OSTROLENK, FABER, GERB & SOFFEN
ATTORNEYS

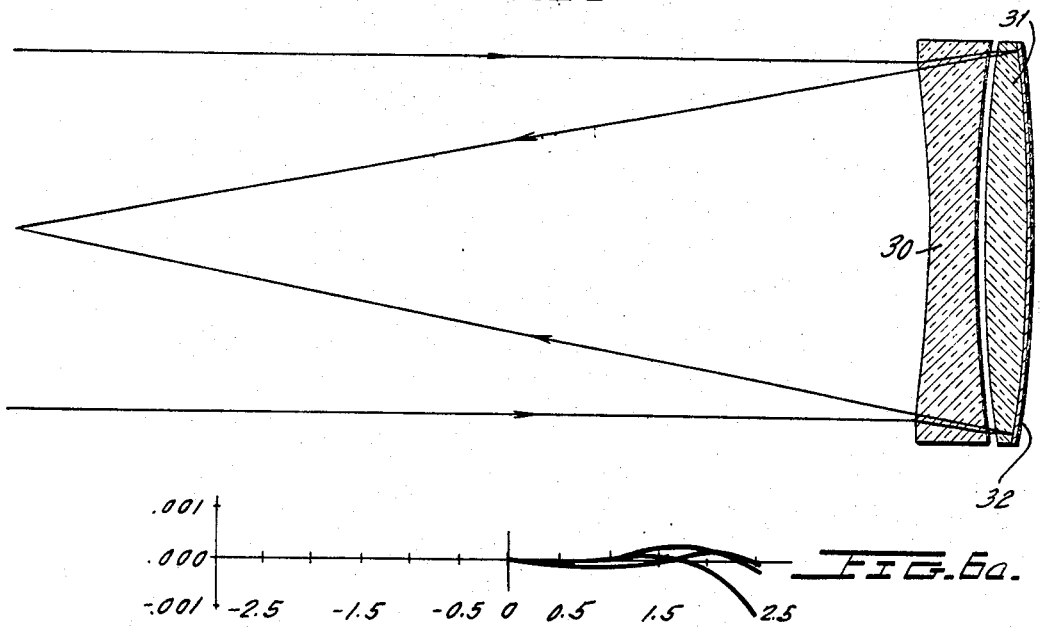
FIG. 5
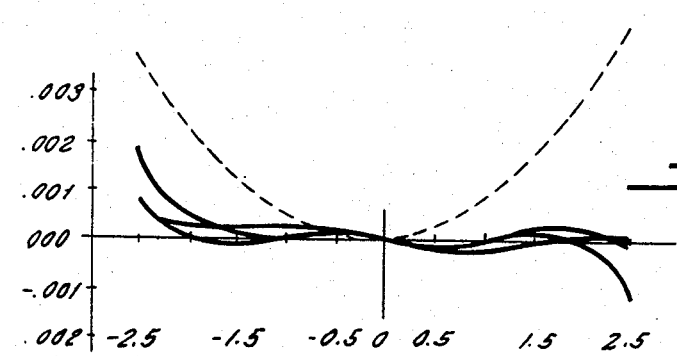
FIG. 6a
FIG. 6b
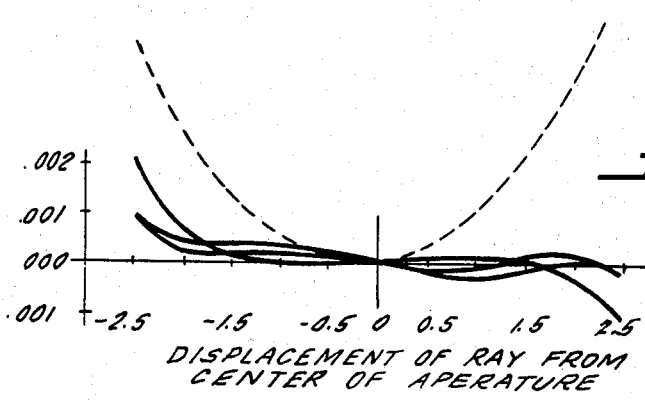
FIG. 6c
DISPLACEMENT OF RAY FROM CENTER OF APERATURE
DISPLACEMENT OF IMAGE PLANE FROM TRUE FOCUS

INVENTORS
SEYMOUR ROSIN
MAX AMON
BY
OSTROLENK, FABER, GERB & SOFFEN
ATTORNEYS

United States Patent Office 3,494,688
Patented Feb. 10, 1970

3,494,688
COLOR CORRECTED MANGIN MIRROR
Seymour Rosin, Massapequa, and Max Amon, Woodmere, N.Y., assignors to Kollsman Instruments Corporation, Elmhurst, N.Y., a corporation of New York
Filed Apr. 6, 1967, Ser. No. 628,883
Int. Cl. G02b 17/06
U.S. Cl. 350—201          8 Claims

ABSTRACT OF THE DISCLOSURE

A color corrected reflecting mirror having spherical surfaces composed of positive and negative lenses comprising a total negative meniscus. The radius of curvature of the entering surface is approximately ⅔ that of the rear reflecting surface. The dispersive power of the positive lens is higher than that of the negative lens with color correction obtained at the interface between the positive and negative lenses. Coma corrected versions are obtained by; (a) spacing the positive and negative lenses with an air space and adjusting the curvature of the adjacent surfaces forming the air space; or (b), by using different indices of refraction for the two lenses which differ from one another by from 0.02 to 0.1, with the negative element lower than the positive element.

---

This application is directed to an improved reflecting mirror structure of the type described in copending application Ser. No. 590,345 (K–374), filed Oct. 28, 1966, in the name of Max Amon et al., entitled "Star Tracker Assembly Using Mangin Mirror" and assigned to the assignee of the present invention where, however, in accordance with the present invention, the reflecting system is color corrected.

This invention relates to a reflecting mirror having spherically curved surfaces and a rear reflective coating, and more specifically relates to a novel reflecting mirror having spherically shaped surfaces which are composed of a positive and negative lens combination comprising a total negative meniscus with color correction and, if desired, coma correction obtained at the adjacent surfaces of the two lenses, or by control of the respective indices of refraction of the lenses.

In order to form a sharp image of a small, distant object, such as a star, it is common practice to use a single parabolical reflecting surface. Such devices, however, have a small field of view because of coma aberrations. Moreover, since the surface is non-spherical in shape, parabolical reflectors are difficult to manufacture, especially with increased relative aperture (low F numbers).

It is well known that the parabolical-type reflector could be replaced by a reflecting mirror composed of two spherical surfaces which form a concave meniscus which is silvered on the back of the mirror. Such mirrors are commonly known as "Mangin" mirrors, which term shall be used hereinafter for this type of reflecting structure. In a Mangin mirror, the radius of curvature of the entering surface (which is also the exiting surface) is approximately ⅔ that of the reflecting surface. This choice will result in correction of spherical aberration, since the undercorrected spherical aberation of the reflecting surface will be neutralized by the two passes of the light beam through the overcorrecting front surface. Thus, the resultant image will be focused at an accurately located point for a given color.

A third order analysis of the classical Mangin mirror indicates correction not only for spherical aberration (for a given color) but also partial correction for coma. Thus, in the Mangin mirror, the coma coefficient is reduced by 60% from that of a parabolical reflector of equal aperture and focal length. Analysis of the two degrees of freedom of design of the Mangin mirror (its thickness and its index of refraction) indicate that correction of spherical aberration may be effected by varying the radius of curvature of the front surface while, however, the coma coefficient remains essentially unchanged from its 40% value, as compared to an equivalent parabolical reflecting surface.

The classical Mangin reflector is not corrected for primary color aberration. Thus, the light rays traverse, in effect, two negative single lenses, one before and one after reflection of the light ray. This necessarily impresses color over correction at the image plane.

In accordance with the present invention, the classical Mangin reflector is divided into a negative component lens and a positive component lens where the positive component lens includes the rear silvered reflecting surface. The overall lens form will have the shape of a negative meniscus, and the positive component is made of a glass having a higher dispersion (a lower Abbe number) than the negative lens. This novel combination of lenses then produces an interior lens surface of spherical curvature which, in combination with different dispersion powers for the two lens components, the desired color correction of the invention. Clearly, all surfaces of the novel combination will be spherical and thus relatively easy to produce, as compared to a parabolical reflecting surface.

When the two lenses are joined surface-to-surface, a substantial color aberration improvement is produced. The coma, however, remains essentially the same as that for an uncorrected Mangin mirror which is about 40% that of the equivalent parabolical reflector.

It will be apparent that a mirror constructed in this manner will present a small and compact volume which lends itself to many optical applications in which small volume is a factor.

In accordance with a second embodiment of the invention, the positive and negative lenses defining the color corrected mirror are spaced from one another so that the adjacent surfaces may have different radii, thereby imparting an additional degree of freedom to the design of the system which can be used for eliminating coma aberration.

As a further embodiment of the invention, it has also been found that good correction for coma can be obtained by the use of different indices of refraction for the two lenses. In particular, the lenses should have a difference in index of refraction in the range of from 0.02 to 0.01 with the index of the negative lens having the smaller value.

Accordingly, a primary object of this invention is to provide a novel reflecting mirror structure which is either or both color and coma corrected.

Yet another object of this invention is to provide a novel reflecting mirror incorporating spherical surfaces which are partially or fully coma corrected.

A still further object of this invention is to provide a reflecting mirror having spherical surfaces which are coma corrected.

Yet another object of this invention is to provide a novel compact reflecting mirror structure for imaging a point source without substantial aberration.

Yet another object of this invention is to provide a novel reflecting mirror composed of a combination of negative and positive lenses having different indices of refraction for coma correction.

A still further object of this invention is to provide a novel reflecting mirror which is either or both color corrected and coma corrected and which is compact in size.

These and other objects of this invention will become apparent from the following description when taken in connection with the drawings, in which.

Figure 2A:
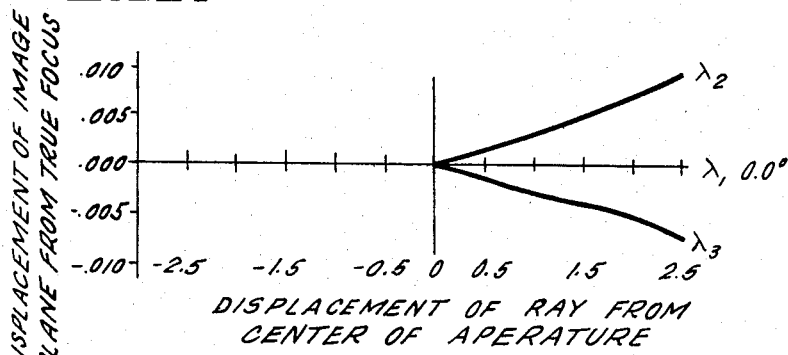
FIGURES 2a and 2b illustrate ray traces of the Mangin mirror of FIGURE 1 plotting, for three different colors, displacement of the image plane from the desired focus as a function of displacement of the ray from the center of the aperture for a 0° angle of the ray to the optical axis of the mirror and a 1° angle of the ray, respectively.
Figure 2B:
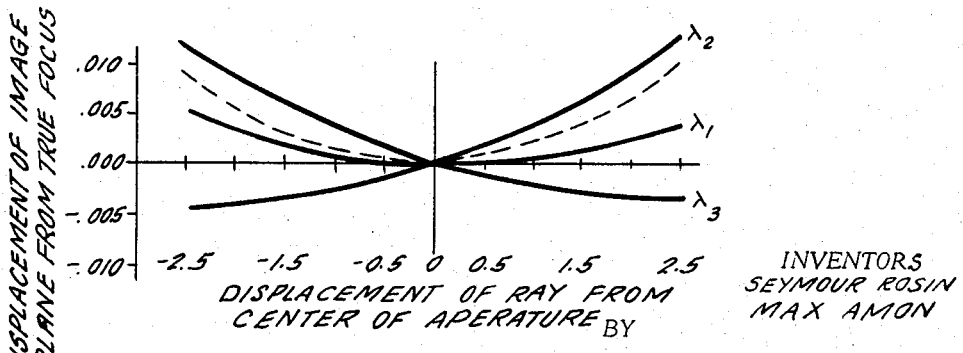
Figure 3:
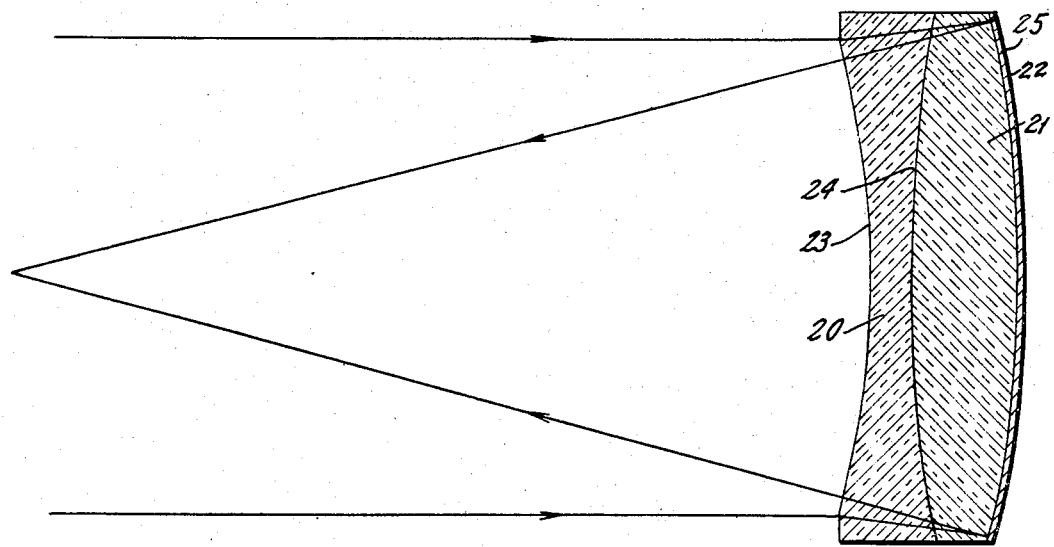
FIGURE 3 illustrates a lens constructed in accordance with the present invention.
Figure 4A:
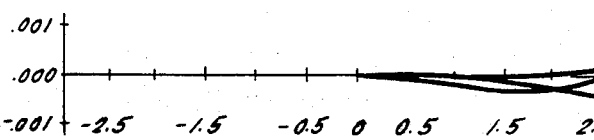
Figure 4B:
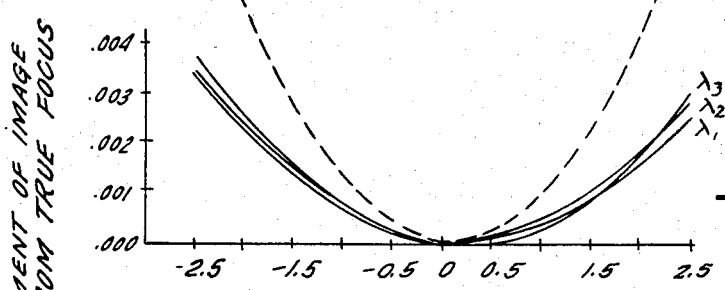
Figure 4C:
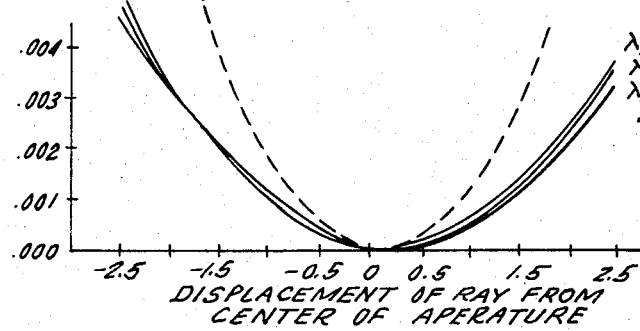

FIGURES 4a, 4b and 4c are similar to FIGURES 2a and 2b and illustrate the characteristics of the mirror of FIGURE 3 for 0° rays, 0.75° rays and 1° rays, respectively.

FIGURE 5 illustrates a second embodiment of the invention wherein positive and negative lens components are spaced by an air space to introduce coma correction into the reflector.

FIGURES 6a, 6b and 6c are similar to FIGURES 2a and 2b for 0°, 0.75° and 1.0° ray angles, respectively.

Figure 7A:
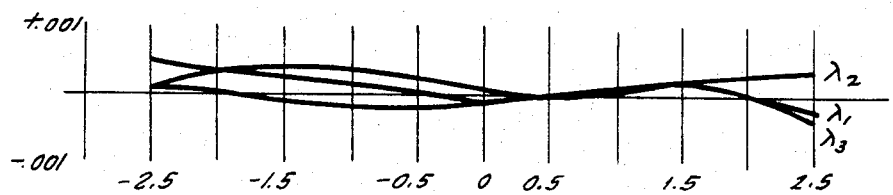
Figure 7B:
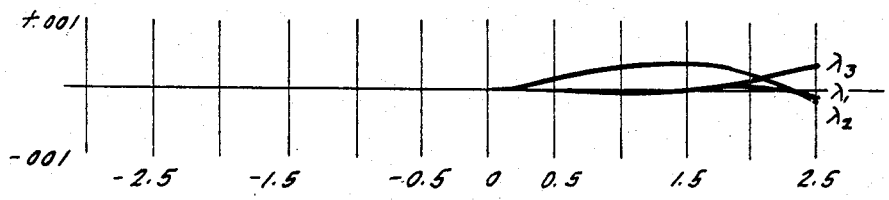

FIGURES 7a and 7b are similar to FIGUERS 2a and 2b for 0° and 0.75° meridional ray angles, respectively, for a lens constructed in accordance with the illustration of FIGURE 3 where, however, the lens components have different indices of refraction.

Figure 8:
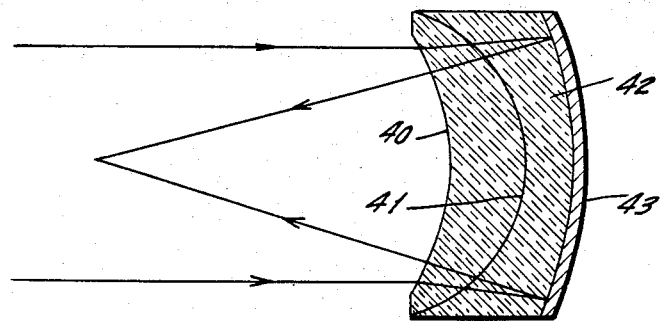

FIGURE 8 illustrates an embodiment of the invention similar to that of FIGURE 3 to illustrate a reversal in position of the positive and negative lenses.

Figure 1:
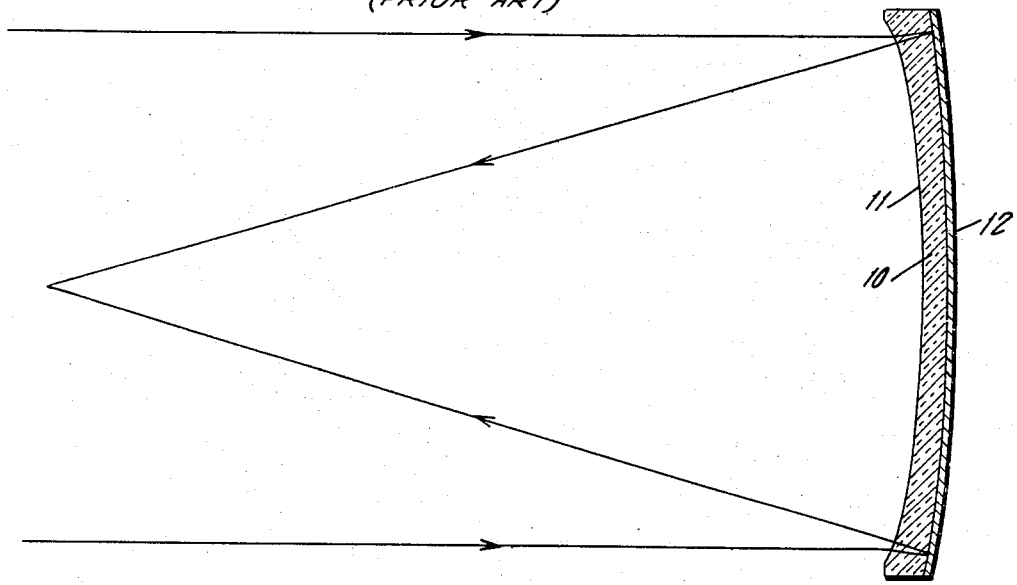
FIGURE 1 illustrates a classical prior art type of Mangin mirror.

Referring first to FIGURE 1, there is illustrated therein a typical prior art classical Mangin mirror composed of a glass lens 10 having a front negative surface 11 and a rear negative surface 12, which has a reflecting coating thereon. The mirror of FIGURE 1 has an aperture of 5 inches and an F number of 1.76. In FIGURE 1, surface 11 has a radius of curvature of −8.990, while surface 12 has a radius of curvature of −13.455. The lens thickness is 0.224 inch; the index of refraction is 1.511 and a K7 glass is used. Ray traces of the mirror of FIGURE 1 are shown in FIGURES 2a and 2b for rays parallel to the lens axis and for meridional rays forming an angle of 1° to the lens axis.

FIGURES 2a and 2b illustrate the spherical aberration of the lens for three different colors λ1, λ2 and λ3, which have wavelengths of .7682, .5876 and 1.0140 microns, respectively. This range of wavelengths was used since it corresponds to the sensitivity range of a silicon photosensing cell with which the mirror can be used as in the star tracker application of above noted copending application Ser. No. 590,345. The dotted line shown in FIGURE 2b indicates the equivalent response to a parabolical mirror having the same relative aperture as the mirror of FIGURE 1. It is seen, for example, in FIGURES 2a and 2b that the mirror characteristics are good for the central color wavelength λ1 with less than one-half the coma aberration of the equivalent parabolical mirror. However, the correction for the outer wavelengths of λ2 and λ3 is poor and these colors are seriously defocused up to about 0.010 inch in focal point displacement. Similar analysis would illustrate a coma error of about 40% of the equivalent parabolical surface where, however, the coma error is completely overshadowed by the color aberration.

FIGURE 3 illustrates the novel color corrected Mangin mirror of the present invention where the mirror is comprised of a negative lens 20 and a positive lens 21 which are secured together at their interface. A reflective coating 22 is then applied to the right-hand side of positive lens 21. The mirror of FIGURE 3 is made to have the same relative aperture as the mirror of FIGURE 1 so that the characteristics of the two can be compared. Thus, the composite mirror of FIGURE 3 has an aperture of 5 inches and an F number of 1.76. Since the overall lens form of FIGURE 3 comprises a negative meniscus, the positive lens 21 is made of a glass having a higher dispersive power than that of negative lens 20. To this end, lens 20 was made of SK19 glass, while lens 21 was made of KZFS4 glass. The characteristics of the lenses are listed in the following table:

| Surf No. | Radius | Thickness | nd | ν | Glass |
|---|---|---|---|---|---|
| (1) | −9.435 | 0.346 | 1.6134 | 57.28 | SK19 |
| (2) | 37.500 | 1.092 | 1.6134 | 43.91 | KZFS4 |
| (3) | −14.357 | −1.092 | −1.6134 | 43.91 | KZFS4 |
| (4) | 37.500 | −0.346 | −1.6134 | 57.28 | SK19 |
| (5) | −9.435 | | | | |

In the above noted table, the surfaces (1) through (5) correspond to the surfaces sequentially seen by a light ray traversing the mirror. Thus, surface (1) is the equivalent of surface 23 of lens 20; surface (2) is equivalent to the surface interface 24 between lenses 20 and 21; surface (3) is equivalent to the reflecting surface 25 of lens 21; surface (4) is again equivalent to the interface 24; and surface (5) is again equivalent to the surface 23 of lens 20. The ray traces obtained from the lens of FIGURE 3 are illustrative in FIGURES 4a, 4b and 4c for 0° light rays; for light rays having an angle of 0.75°, and for light rays having an angle of 1°, respectively. It will be noted that the scale of FIGURES 4b and 4c is about ⅕ the scale of FIGURES 2a and 2b where there is excellent axial performance, as shown in FIGURE 4a, as compared to FIGURE 2a for color correction, while FIGURES 4b and 4c illustrate performance which is better than twice that of the equivalent parobolical reflector with little color error between the wavelengths λ1 and λ3.

The coma correction for the lens of FIGURE 3 is again approximately 40% of the coma correction obtained with the equivalent paraboloidal reflector.

In accordance with a further feature of the present invention, however, the coma correction can be further improved by spacing the positive and negative lenses of FIGURE 3 to permit adjustment of their adjacent curvatures. This arrangement is illustrated in FIGURE 5 which uses a negative lens 30 and positive lens 31 which has a reflecting coating 32 on the rear surface thereof. The lens used in FIGURE 5 has an aperture of about 5 inches and an F number of about 3.2. The design parameters for the lens are given in the following table where again the surface numbers refer to the surfaces sequentially seen by a light ray traversing the mirror:

| Surf No. | Radius | Thickness | nd | νd | Glas |
|---|---|---|---|---|---|
| (1) | −12.009 | 0.340 | 1.6134 | 57.28 | SK19 |
| (2) | 18.979 | 0.100 | | | |
| (3) | 19.198 | 0.700 | 1.6134 | 43.91 | KZFS4 |
| (4) | −20.700 | −0.700 | −1.6134 | 43.91 | KZFS4 |
| (5) | 19.198 | −0.100 | −1.0 | | |
| (6) | 18.979 | −0.340 | −1.6134 | 57.28 | SK19 |
| (7) | −12.009 | | −1.0 | | |

Note that the desirable color correction is retained by using a total negative meniscus and dispersive power of lens 31 greater than that of lens 30. In the lens of FIGURE 5, the separate powers of the two components 30 and 31 are adjusted to correct primary color aberration. The bending of the two components, however, affords two degrees of freedom which are utilized to correct spherical aberration and coma. Note that contrary to an air spaced doublet, this bending produces large changes in the overall focal length since the bending affects the radius of curvature of the reflecting surface.

The operation of the lens of FIGURE 5 is illustrated in FIGURES 6a, 6b and 6c again for light ray angles of 0°, 0.75° and 1°. In this configuration, as shown in FIGURES 6a, 6b and 6c, spherical aberration and color separation were reduced substantially. In addition, coma error was also reduced substantially. Note that in FIGURES 6a, 6b and 6c, the lens aperture was held at 5.0 units while the focal length changed because of the bending process so that the system now worked at F/3.2.

As another important feature of the invention, it has been found that coma correction can be obtained in a composite lens in which the positive and negative components have different indices of refraction which vary from one another in the range of from 0.02 to 0.01 with the negative lens having the lower index of refraction. This can be used in combination with diverse dispersive powers for the lenses so that both color correction and coma correction can be obtained in a composite lens.

One typical arrangement using different refraction indices for the two lenses is given in the following chart for a lens of the type described in FIGURE 3.

| Surf. No. | Radius | Thickness | nd | ν |
|---|---|---|---|---|
| (1) | −7.215 | .595 | 1.582185 | 58.2 |
| (2) | 38.417 | 1.401 | 1.6439090 | 40.2 |
| (3) | −13.784 | −1.401 | −1.6439090 | 40.2 |
| (4) | 38.417 | .595 | −1.582185 | 58.2 |
| (5) | −7.215 | | −1.000000 | |

The above noted calculated chart provides the characteristics disclosed in FIGURES 7a and 7b. Each of FIGURES 7a and 7b clearly show a dramatic correction of spherical and coma aberration for the case of 0° rays and 0.75° rays. Note that the scale of FIGURE 7b is expanded with respect to the scale of FIGURE 6b.

While the foregoing figures have described the novel lens of the invention with the first lens being the negative lens and the second lens being the positive lens, it will be apparent that the lenses could be reversed, as illustrated in FIGURE 8, to have a front positive lens 40 cemented along a cement junction 41 to a rear negative lens 42 having a reflective coating 43 thereon. All of the comments given in the preceding with regard to the function of the lens hold true for the case of FIGURE 8.

We claim:
1. A color corrected Mangin-type mirror comprising:
   a negative lens having first and second surfaces of spherical curvature of radii $r1$ and $r2$ respectively and having a thickness $t1$,
   a positive lens having first and second surfaces of spherical curvature of radii $r3$ and $r4$ respectively and having a thickness $t2$,
   said negative lens and said positive lens each having an index of refraction of 1.6134,
   said negative lens and said positive lens having a common optical axis, the second of said surfaces of said negative lens being adjacent the first of said surfaces of said positive lens,
   said positive lens having a dispersive power greater than said negative lens,
   the second of said surfaces of said positive lens having a reflective coating thereon,
   where $r1=-9.435$, $r2=37.5$, $r3=37.5$, $r4=-14.357$, $t1=0.345$ and $t2=1.092$.
2. A color corrected Mangin-type mirror in accordance with claim 1 wherein said positive lens has an Abbe number of 43.91 and said negative lens has an Abbe number of 57.28.
3. A color corrected Mangin-type mirror in accordance with claim 1 wherein said positive lens comprises KZFS4 glass and said negative lens comprises SK19 glass.
4. A color corrected Mangin-type mirror corrected for coma comprising:
   a negative lens having first and second surfaces of spherical curvature of radii $r1$ and $r2$ respectively and having a thickness $t1$,
   a positive lens having first and second surfaces of spherical curvature of radii $r3$ and $r4$ respectively and having a thickness $t2$,
   said negative lens having an index of refraction of 1.6134, said positive lens having an index of refraction of 1.6134,
   said negative lens and said positive lens having a common optical axis and being spaced therealong by a distance $d$, the second of said surfaces of said negative lens facing the first of said surfaces of said positive lens,
   said positive lens having a dispersive power greater than said negative lens,
   the second of said surfaces of said positive lens having a reflective coating thereon,
   where $r1=-12.009$, $r2=18.979$, $r3=19.198$, $r4=-20.7$, $t1=0.34$, $t2=0.7$ and $d=0.1$.
5. A color corrected Mangin-type mirror in accordance with claim 4 wherein said positive lens has an Abbe number of 43.91 and said negative lens has an Abbe number of 57.28.
6. A color corrected Mangin-type mirror in accordance with claim 4 wherein said positive lens comprises KZFS4 glass and said negative lens comprises SK19 glass.
7. A color corrected Mangin-type mirror comprising:
   a negative lens having first and second surfaces of spherical curvature of radii $r1$ and $r2$ respectively and having a thickness $t1$,
   a positive lens having first and second surfaces of spherical curvature of radii $r3$ and $r4$ respectively and having a thickness $t2$,
   said negative lens having an index of refraction of 1.582185, said positive lens having an index of refraction of 1.6439090,
   said negative lens and said positive lens having a common optical axis, the second of said surfaces of said negative lens being adjacent the first of said surfaces of said positive lens,
   said positive lens having a dispersive power greater than said negative lens,
   the second of said surfaces of said positive lens having a reflective coating thereon,
   where $r1=-7.215$, $r2=38.417$, $r3=38.417$, $r4=-13.784$, $t1=0.595$, and $t2=1.401$.
8. A color corrected Mangin-type mirror in accordance with claim 7 wherein said positive lens has an Abbe number of 40.2 and said negative lens has an Abbe number of 58.2.

References Cited

FOREIGN PATENTS 1,290,246  3/1962  France.

OTHER REFERENCES

Churilovskii et al.: "An Apochromatic Catadioptric System Equivalent to a Parabolic Mirror," Applied Optics, vol. 3, No. 7, pp. 843–846, July 1964.

Gavrilov: "Calculation of an Uncemented Two-Lens System With One Reflecting Surface," Optics and Spectroscopy, vol. XX, No. 5, pp. 486–490, May 1966.

JOHN K. CORBIN, Primary Examiner